Feb. 25, 1969   L. A. MICALLEF   3,429,483
CAPTIVE ACTUATOR FOR PRESSURE OPERATED CONTAINER
Filed Feb. 24, 1967   Sheet _1_ of 3
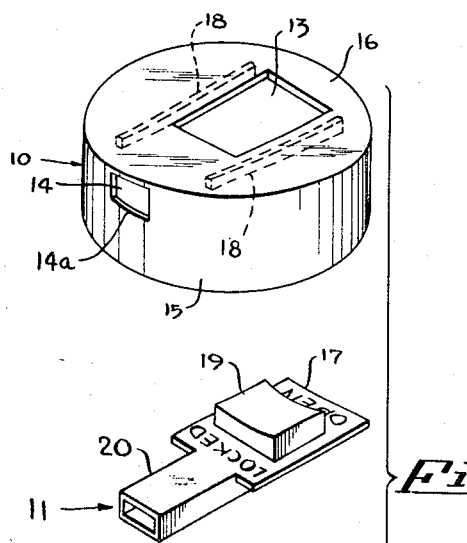
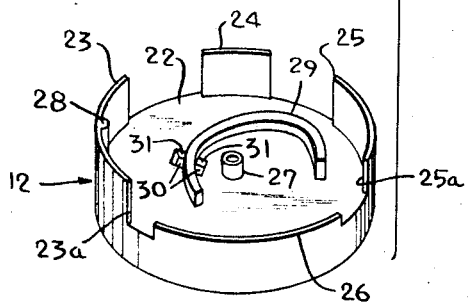
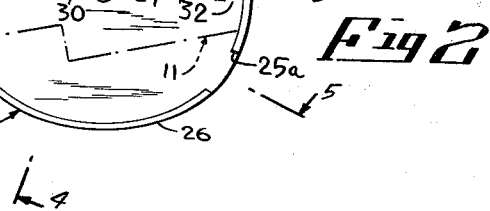
Fig 1
Fig 2
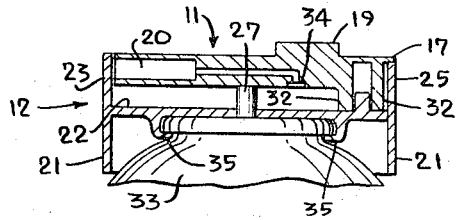
Fig 3
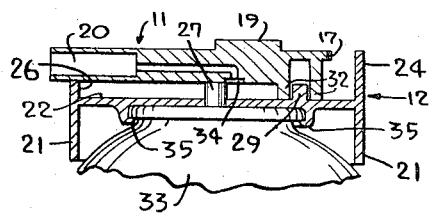
Fig 4
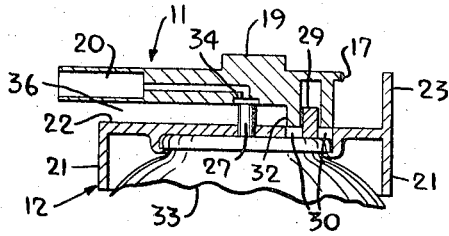
Fig 5
INVENTOR:
LEWIS A. MICALLEF,
BY *[signature]*
HIS ATTORNEY

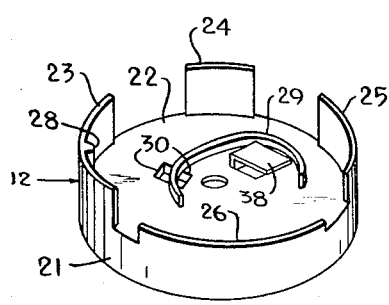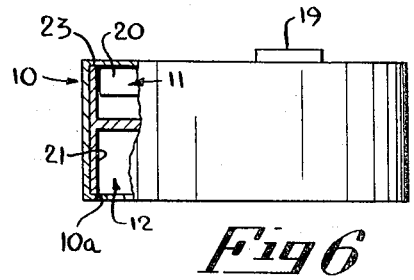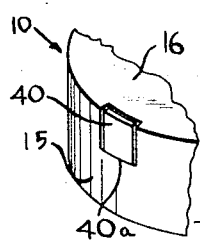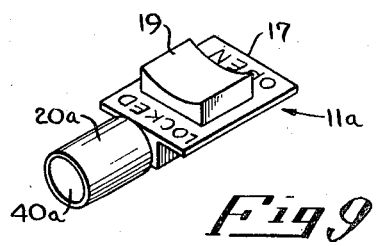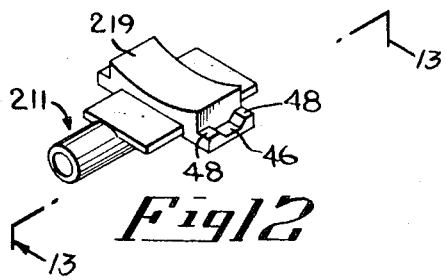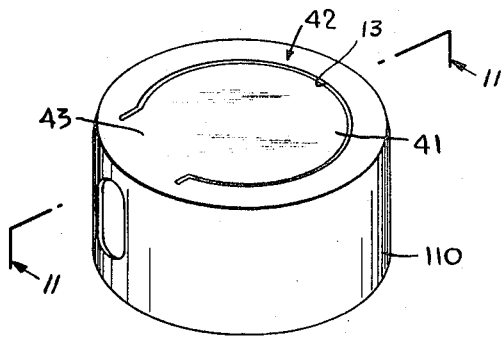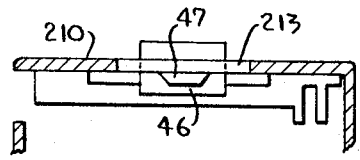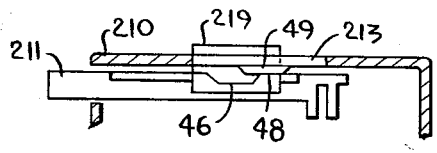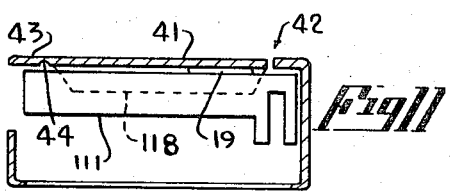

INVENTOR:
LEWIS A MICALLEF,
HIS ATTORNEY.

United States Patent Office 3,429,483
Patented Feb. 25, 1969

3,429,483
CAPTIVE ACTUATOR FOR PRESSURE
OPERATED CONTAINER
Lewis A. Micallef, New York, N.Y., assignor, by mesne assignments, to Leeds & Micallef, New York, N.Y., a partnership of New York
Filed Feb. 24, 1967, Ser. No. 618,385
U.S. Cl. 222—153          24 Claims
Int. Cl. B67d 5/32; B65d 83/14

ABSTRACT OF THE DISCLOSURE

A rotatable captive actuator for a pressure operated container for pressurized flowing material. The actuator receives a portion of the pressure release stem, and has rotatable means to rotate the spout structure. The rotatable means upon opposite rotation rotate the spout structure between two positions. In one of these positions the stem can be operated to permit discharge of the material through the spout structure, and in the other of these positions the stem cannot be operated and the spout structure is in a protected position within the cover.

This invention relates to captive actuators for containers for pressurized flowing material. More particularly, the invention relates to a captive actuator for a valve operated pressurized flowing material container, such as either a permanently pressurized container for instance of the "aerosol" type, or a temporarily pressurized container for instance of the pump type, for example of the oscillating piston pump type. In the first named container, the valve comprises a stem which when depressed unseats the valve to permit the ejection of the material. In the second named container, the stem is a projection of the actuatable part of the pump and is actuated in a conventional manner. (Reference is had, for instance, to Patent No. 2,362,080 for an oscillating pump with two opposite check valves for suction and discharge strokes, and to Patents Nos. 3,159,316 and 3,198,403 for oscillating pumps with one check valve sealing itself on release.)

The typical container for permanently pressurized flowing material is provided with a valve that serves to control the release or discharge of the material contained therein, such material being maintained under superatmospheric pressure within the container. The valve generally includes a stem which extends axially through the top of the valve, the depression of the stem operating to unseat the valve to permit the contents of the container to be discharged. (Reference is had, for instance, to Patents Nos. 3,257,036, 3,089,624, 3,203,454 and 2,937,791.)

The instant actuator may include a cap, in which event it is sometimes termed a dispensing cap. The actuator, however, as will be described later on herein may be without cap.

Dispensing caps have been provided for pressure operated containers both to prevent accidental operation and to simplify the method of employing the container. These caps, however, still do not successfully prevent all accidental operation, with the consequent discharge of the content. In addition, they do not prevent the drying out of the material in the discharge spout nor do they prevent its contamination.

Furthermore, since many products which are dispensed in pressurized form such as cosmetics, toiletries, and so forth, are of beautifying nature and have an esthetic connotation, it is desirable that the container and the dispensing cap thereon be of a pleasing aspect. In this wise, the known container caps are also deficient in that their configurations are characterized by constantly protruding spouts, exposed orifices, bulges, and unsmooth and uneven contours.

Accordingly, it is among the principal objects of the invention to provide a captive actuator, with or without cap, for pressure operated containers, which prevents any accidental discharge of the material and which protects the material from drying and contamination.

It is another object of the invention to provide a captive actuator for such containers in accordance with the preceding object which in its nondispensing state is characterized by smooth, continuous and eye-pleasing contours.

Further objects and advantages of the invention will be set forth in part in the following specification and in part will be obvious therefrom without being specifically referred to, the same being realized and attained as pointed out in the claims hereof.

For a fuller understanding of the nature and objects of the invention, reference should be had to the following detailed description, taken in connection with the accompanying drawings, in which:

FIG. 1 is a perspective exploded view of a dispensing cap in accordance with an embodiment of the invention;

FIG. 2 is a plan view of the base component shown in FIG. 1 with the cover removed;

FIG. 3 is a sectional view taken along the line 3—3 of FIG. 2 with the spout structure in the retracted position;

FIG. 4 is a sectional view similar to FIG. 3, but taken along the line 4—4 of FIG. 2 showing the spout structure in a partially projecting position;

FIG. 5 is a sectional view similar to FIG. 3, but taken along the line 5—5 of FIG. 2 showing the spout structure in the projecting position;

FIG. 6 is an end elevational view, partly in section, of the components of the cap in the assembled condition;

FIG. 7 is a perspective view of the base embodying a modification;

FIG. 8 is a fragmentary perspective view of a part of a modified cover;

FIG. 9 is a perspective view of a modified spout structure;

FIG. 10 is a perspective view of a modified cap that is molded in one piece and has a top which includes a flap integral with the top but hinged only at one segment to the remainder of the top of the cap and movable relative thereto;

FIG. 11 is a sectional view, taken on the line 11—11 of FIG. 10;

FIG. 12 is a fragmentary perspective view, showing a modification as compared to FIG. 1, permitting continued spray;

FIG. 13 is a fragmentary sectional view, taken on the line 13—13 of FIG. 12, showing the spout structure in the retracted, inactive position;

FIG. 14 is a fragmentary sectional view, similar to FIG. 13 but with the spout structure extended into the discharge position and depressed for continuous spray;

Figure 15:
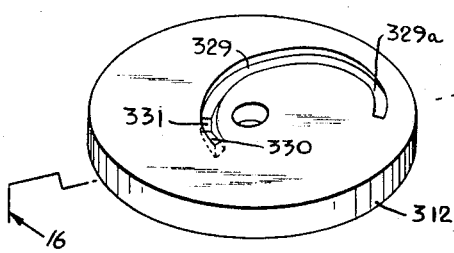
FIG. 15 is a perspective view of a modified base.

In carrying the invention into effect in the embodiments which have been selected for illustration in the accompanying drawings and for description in this specification, and referring now particularly to FIG. 1, there is shown a cover 10, a spout structure 11 and a base 12. The spout structure includes a spout or discharge orifice 20 near one end. In the assembled form the spout structure 11 is inserted into the cover 10 as further explained hereinbelow, and the cover-spout structure combination is placed over the base 12. The cap which results from such assembly is placed over the upper end of a valve operated dispensing container 33 for pressurized flowing material. FIG. 6 shows the assembled cap.

Referring to FIG. 1, it is seen that the cover 10 is a hollow structure of cylindrical configuration. In this connection, whereas its inner contour is desirably of such cylindrical shape, its outer contours may be as desired, for instance of circular or polygonal configuration in horizontal section. The upper wall 16 of the cover 10 has a window 13 therein which may be of rectangular shape and the longer dimension of the window 13 be in line with an opening 14 in the circumferential wall 15 of the cover 10. Two parallel disposed guides 18 are provided on the undersurface of the upper wall 16; and each guide 18 is located substantially parallel to and equally spaced from the opposite longer sides of the window 13.

The dimensions of the window 13 and the distance between the guides 18 are so chosen that the width of a portion 17 of the spout structure 11 that carries a button 19 can be accommodated between the guides 18 so that the button 19 protrudes through the window 13 above the surface of the upper wall 16 and with the spout 20 of the spout structure 11 extendable through the opening 14.

The base 12 is also of hollow cylindrical construction and has an outer diameter substantially equal to the inner diameter of the cover 10, whereby the cover 10 may be snap fitted thereover. The base 12 comprises a side wall 21 and a top wall 22. Extending upwardly from the top wall 22 are tabs 23, 24, 25 and 26. The tabs 23 to 26 are of circular arcuate outline continuous with the portions of the side wall 21 from which they extend and are suitably integral therewith. The total height of the tabs 23, 24 and 25, respectively, and the side wall 21 are substantially equal to the height of the side wall 15 of the cover 10.

The tab 26 is chosen to have a height such that its upper surface lies substantially in a horizontal plane with the bottom side 14a of the opening 14 in the cover 10. As will be further shown hereinbelow, the height of the tab 26 and the location of the bottom side 14a of the opening 14 is determined by the height of an upper portion 27 of the discharge member, such as the stem of the valve of the container that projects above the surface of the wall 22 of the base 12. The tab 23 is provided on its inner surface with an upright post 28 which is suitably integral with the tab 23 and serves as a stop as is explained below. The length of the portion of the tab 23 from the post 28 to its edge 23a suitably is at least as great as that of the width of the spout 20.

An arcuate moving cam means or cam 29 is provided as a ridge on the wall 22, and may be of rectangular cross section. This cam 29 also has height substantially equal to the height of the valve stem portion 27 and serves as a guide for a cam follower means, such as a pair of pins 32 extending from the undersurface of the spout structure 11 during the rotation of the cover 10-spout structure 11 combination about the base 12 at the operation of the cap. A pair of holes 30 are formed in the wall 22 and constitute a clearance for receiving the aforementioned pins 32 upon the rotation of the aforesaid combination.

Referring now to FIG. 2, the base 12 is shown in plan view therein and the spout structure 11 is shown in broken outline as it would be located therein with the cover 10 in position and the spout structure 11 in the fully retracted position. The pins 32 are shown in FIG. 2 in broken lines, and the pins 32 are guided in their paths by the cam 29 during the rotation of the cover 10 and the spout structure 11. It is to be noted that the inner surface of the tab 23 between the post 28 and the edge 23a may be squared off to provide a contour coincident with the contour of the spout 20.

In FIG. 3, the spout structure 11 is disposed in the retracted position indicated by the direction of the line 3—3 of FIG. 2, and is completely contained between the tabs 23 and 25. The undersurface of the spout structure 11 almost rests on the valve stem portion 27 which extends from the container 33. The pins 32 are disposed along the respective vertical sides of the cam 29 and terminate near or on the wall 22. A spout hole 34 that is provided at the undersurface of the spout structure 11, and communicates interiorly with the spout 20 is disposed laterally with respect to the valve stem portion 27. Flange structures 35 may suitably be provided extending vertically from the lower surface of the wall 22 to fit snugly over the top of the container 33.

In FIG. 4, the spout structure 11 is rotated to a position of partial projection in the direction indicated by the line 4—4 of FIG. 2. Here, it is seen that the spout structure 11 is no longer completely contained within the base 12, the spout 20 rests on the tab 26 and protrudes beyond the outer surface thereof and the outer surface of the wall 21. The outer end of the spout structure 11 is radially spaced from the tab 24 as determined by the rotational path of the spout structure 11 about the cam 29. The spout hole 34, however, is not as yet in vertical registration with the valve stem portion 27 so that no pressurized material can as yet enter the spout 20.

In FIG. 5 the spout structure 11 is rotated to the projecting position indicated by the direction 5—5 of FIG. 2. Here it is seen that the pins 32 are poised over the holes 30, the spout hole 34 is in vertical registration with the valve stem portion 27, and the spout 20 is in its most extended position, radially spaced from the tab 23, with the spout 20 extending over the tabless portion 36 of the wall 22 and the side of the spout 20 rests against a stop 25a (FIGS. 1 and 2).

Thus considering the operation of the cap, with the spout structure 11 inserted in the cover 10 so that the button 19 protrudes through the window 13, and with the cover-spout structure combination in place over the base 12, and the whole assembly mounted on the container 33, with the valve stem portion 27 extending above the wall 22, the fully closed position is as shown in FIG. 3. At this point the spout structure 11 is fully contained in the cap. In this position (see FIG. 1) the legend "LOCKED" of the spout structure 11 will be visible in the window 13.

When the cover is rotated in counter-clockwise (FIGS. 1 and 2) direction, the spout structure 11 will be rotated therewith because of the confining action of the guides 18, the rotation causing the spout structure 11 to take a path as determined by the cam 29 and the guide pins 32. During the rotation, the spout 20 protrudes gradually laterally through the opening 14 and when the position shown in FIG. 5 is attained, the spout 20 is in its most extended position and the cap is in a position to permit the pressurized material to be ejected from the stem portion 27 into the spout hole 34 and thence into the spout 20. Thus, when the position of FIG. 5, namely the fully projected position is attained, the pressing of the button 19 will cause the spout structure 11 to engage tightly the valve stem portion 27 and will depress the stem portion 27 causing the emission of the pressurized material into the spout 20. At this juncture, the legend "OPEN" is visible in the window 13.

This condition will obtain until the cover 10 and the spout structure 11 are rotated clockwise (FIGS. 1, 2), whereby the removal of the pins 32 from the holes 30 will be effectuated by their engaging inclined lifting cams 31 that are adjacent the holes 30. This will free the valve stem portion 27 from its engagement with the spout hole 34. The fully closed position is attained when the cover 10 and spout structure 11 are rotated back to the position shown in FIG. 3. It is to be realized, however, that pressurized material can be discharged through the spout 20 only when the cover 10 and spout structure 11 are in the position shown in FIG. 5. Thus, there is provided a dispensing cap wherein the pressurized material can be discharged only when the cap is in the fully open position.

As best shown in FIG. 6, the bottom edge 10a of the side wall 15 of the cover 10 may be undercut to provide a complete closure. It is seen in FIG. 6, that when the spout structure 11 and the cover 10 are in the completely closed position, the tip of the spout 20 is covered by the tab 23 so that it is enclosed thereby.

In FIG. 7 the base 12 is shown with an added protective feature, namely a cover 38 for the spout hole 34. In this connection, it is to be realized that the dispensing cap according to the invention may be made of plastic, such as polyethylene, and thus the spout hole cover 38 may be integrally molded with the remainder of the base 12. The cover 38 operates to cover the spout hole 34 when the cap 10 is in the closed position thereby preventing the drying or contamination of the material after the first use of the dispenser.

In FIG. 8 there is shown a protective feature which may be incorporated in the cover 10, namely a blade or lid 40 which may be integrally molded with the rest of the cover 10 and which may be broken out by the spout 20 at the line 40a upon the first use of the cap on the container, or it may be broken by pushing outwardly thereagainst for instance with one's thumb. The presence of the blade or lid 40 insures the prevention of any tampering with the material container and dispensing cap, and also serves as a seal to indicate to the prospective purchaser that the cap has not previously been used.

In FIG. 9 there is shown a modified spout structure 11a, built as a spray nozzle. To this end the spout 20a may suitably be of cylindrical configuration as contrasted with the parallelepiped form of the spout 20 of the preceding views, and may be provided with a spray head 40a at the end thereof.

As previously explained, the cover 10 may have a window 13 (FIG. 1) through which a button 19 (FIG. 3) protrudes upwardly. When the captive actuator is in the discharge position, pressure exerted onto the button 19 will move the spout structure downwardly into a receiving station in which its spout hole 34 receives the top of the discharge member of the container 33, for instance if it be a permanently internally pressurized container of the "aerosol" type, then this discharge member will be the portion 27 of the valve stem 27 which will be received, as shown in FIG. 5. If, however, the container is pressurized by means of a pump, the discharge member will be a push rod 134 (FIG. 16) that may be oscillated by oscillating movement applied to the button 119.

As best shown in FIG. 10, the window 13 may be covered by a flap 41 that is integrally formed with the top 42 of the cap 110. The flap 41 is integrally hinged to the remainder of the top 42, and is movable relative thereto, so that pressure exerted onto the flap 41 from above will be transmitted to the button 19 of the permanently pressurized container type, or, respectively, to the button 119 of the container 113 (FIG. 16) that is pressurizable by an oscillating pump movement. The cap 110 is preferably molded in one piece with the flap 41 joined only at a bridge portion 43. As shown in FIG. 11, the bridge 43 preferably has an underside terminal notch 44 to facilitate the flexing of the flap 41. Guides 118 are provided on the underside of the cap 110, similar to the guides 18 of FIG. 1. The spout structure is indicated at 111.

Where a container of the "aerosol" type is used, it may be desired to have a sustained spray. For this purpose, the embodiment shown in FIGS. 12, 13 and 14 provides for a button 219 that is shiftable relative to the spout structure 211, and that is provided with cam means 46 that engage with corresponding cam follower means 47 of the cap 210 (FIG. 13). The cap 210 is provided with a window 213, for instance of rectangular cross section, and the button 219 is movable up and down in that window and, in the depressed station also movable parallel to the longer side edges of the window 213. The button 219 does not move with the spout structure 211, and the spout structure 211 is, instead, free to slide through the button 219.

As best shown in FIG. 13, the cam means 46 of the button 219 and the cam follower means 47 of the cap 210 interengage in the retracted, inactive position of the spout structure 211, in which no discharge will take place.

In FIG. 14, the spout structure 211 is shown extended into the discharge position, which it reaches by sliding relative to the button 219, the sliding being controlled by the aforementioned cam means such as the cam 29 and the follower means such as the pins 32 (FIG. 2). The button 219, as previously stated, does not participate in the longitudinal shifting movement of the spout structure 211 between its retracted, inactive position and its projected discharge position. The button 219, on the other hand, can be moved linearly relative to the spout structure 211 when the spout structure 211 is in the projected discharge position as shown in FIG. 14.

When the spout structure 211 is extended, as shown in FIG. 14, the operator may slide the button 219 forward or backwards after he has depressed it, to hold open the valve by means of the valve stem 27. To close the valve, the operator will slide back the button 219 and will release it.

As best shown in FIG. 14, the button 219 is movable in the window 213 for a portion; the button 219, however, will not participate in the linear shifting movement of the spout structure 211 from the retracted to the projected position. In the projected position of the spout structure 211, however, as previously stated, the operator may either merely depress the button 219 to operate the valve, or may slide the button 219 backwards or forwards after he has depressed it, to hold the valve open. In moving it forward, as shown in FIG. 14, for instance, the center portion 49 of the cam follower means 47 will engage one of the parts 48 of the cam 46 of the button 219, thereby maintaining the spout structure 211 in the depressed position, for sustained spray.

If it is desired to stop the sustained spray, the operator will move the button 219 in the opposite direction, thereby releasing the depressing action between the cam means 46 and cam follower means 47, exerted against the spout structure 211.

In the earlier described embodiment, the base 12 is provided with cam means that are formed by an upwardly projecting ridge type cam 29. The cam means, however, instead of being of the ridge type may be a groove. Such a groove is shown at 329 of the base 312, of FIG. 15. These cam means thus include a cam groove 329 that forms the track for a cam follower means, such as an operating pin 332 that is connected to the spout structure 311 (FIG. 16). Where a groove or track type cam is used, the cam follower need be but a single operating pin 332. The pin 332 may be of circular cross section and stronger than the two pins 32 (FIG. 2), yet would not bind in the channel groove 329.

Figure 16:
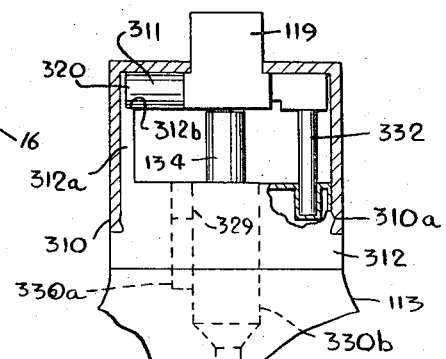
FIG. 16 is a fragmentary elevational view, partly in section, taken on the line 16—16 of FIG. 15, but embodying a further modification.

In FIG. 15, the walls have been omitted from the base 312 for the sake of clarity, and in FIG. 16 it is shown how the groove 329 is sunken into the base 312. As best shown in FIG. 15, an inclined lifting cam 331 may be provided in the groove 329, to guide the pin 332 into and, respectively, out of a hole 330 that is formed in the groove 329. The hole 330 serves to permit the spout structure (not shown in FIG. 15) to engage with its spout hole the discharge member, for instance the valve stem portion 27 of the "aerosol" container 33, or the pump push rod 134 (FIG. 16) of the container 113.

Thus the spout structure is movable in a path between a receiving station wherein the spout hole receives the discharge member and, respectively, an inactive station wherein the spout hole is out of contact with the discharge member. In the receiving station, on the other hand, the spout structure is enabled to move the discharge member so as to permit the discharge of the contents of the container.

At the other end, the groove 329 has an end section 329a, that is so shaped that in the inactive position of the spout structure 311, the spout structure will be pressed from said cam portion 329a through the cam follower pin 332 into a sealing pressure engagement against the wall, for instance of the cap 310 (FIG. 16) to seal the discharge orifice 320 of the spout structure 311.

In the modification of FIG. 16, the groove 329 furthermore, instead of the normal deepened hole 330, is provided with a deep well 330a that is parallel to the direction of opposite pumping movements of the push rod 134 of the pump 330b. The purpose of that well 330a is to permit the pumping action from the button 119 onto the pump push rod 134 of the pump body 330b, when the spout structure 311 is in the discharge position.

Figure 17:
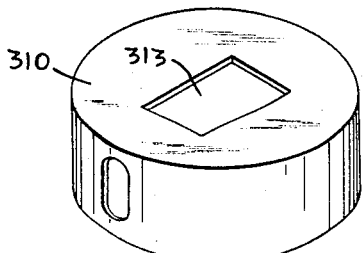
FIG. 17 is a perspective exploded view of a captive actuator in accordance with the modification of FIG. 16.

As shown in FIG. 16, the cap 310 may be rotatable with a snap fit at 310a. The button 119, as best shown in FIG. 17, may be of the plunger type, and the spout structure 311 slides through the button 119 similarly to the manner of FIGS. 12–14 for the sustained spray; although in this instance there is only a sliding effect, but without any sustained spray effect. The window 313 of the cap 310, on the other hand, matches the contour of the button 119, so that the button 119 cannot move along the window, but can only move transverse to the area of the window 313 during the plunger action of the button 119. The top of the spout structure 311 fits into a lower cutout 119a that is formed in the button 119. As best shown in FIG. 16, furthermore, the base 312 has a wall portion 312a that forms on top a stop and support 312b when the pin 332 is in the groove 329 outside the well 330a. Thus, the button 119 can be depressed only if the pin 332 is in the well 330a in which position the base wall support 312b will release the front end of the spout structure 311 for up and down movement.

Figure 18:
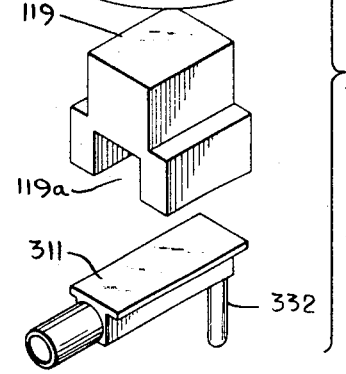
FIG. 18 is a perspective view of a cap for a captive actuator, embodying a further modification.

As previously discussed in connection with FIG. 8, it is desirable to reassure the purchaser that the container has never been used before and thus the contents have not been tampered with. The modification of FIG. 18 serves a similar purpose. Here the button 419 of the cap 410 is disposed in a window 413 in which the button 419 would normally slide together with the spout structure (not shown) when the spout structure is moved from the retracted, inactive position into the projected discharge position. A tab 440 may be disposed in the space of the window 413 between the button 419 and the free edge 413a, which must be removed before the captive actuator can be used.

Figure 19:
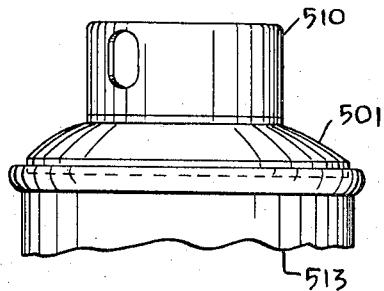
FIG. 19 is a fragmentary elevational view showing a captive actuator with a concealing cap and skirt.

In FIG. 19, there is shown a skirt 501 for the container 513, that is surmounted by the cap 510. The skirt 501 covers the dome of the container 513. The cap 510 and the skirt 501 together substantially completely conceal from the external view the upper portion of the can including the aforesaid base and discharge member as well as the spout structure (not shown in FIG. 19).

Figure 20:
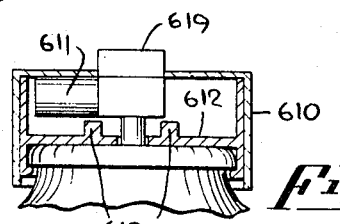
FIG. 20 is a fragmentary central vertical sectional view of a captive actuator, embodying a further modification.

In FIG. 20, a base 612 is shown that may be surrounded by a cap 610; the cap 610, however, is not necessary. The base 612 is provided with projections 612a that are spaced apart for a certain distance. The spout structure 611, on the other hand, may be connected rigidly to the button 619, for instance, be made in one piece therewith. The button 619 may be turned manually directly, or may be in driven connection with the cap 610, so that turning of the cap 610 will also turn the button 619 and therewith turn angularly the spout structure 611. Where the button 619 may be grasped manually and turned, the cap 610 may be dispensed with, as long as sufficient guide means are provided, for instance by the base 612 and its wall, to prevent the accidental removal of the spout structure 611.

In contrast to the previous embodiments, the spout structure 611 may be operated simply by turning it, without linear movement. That does not mean that any linear movement is excluded, but is not necessary in connection with the embodiment of FIG. 20. In the inactive position of the spout structure 611, that is shown in FIG. 20, the spout structure 611 is supported on the projections 612a, and thus is prevented from being pushed downwardly to operate the valve stem, or respectively the pump push rod, depending on the type of container used. When the spout structure 611 is turned, however, as its width is so dimensioned that it is smaller than the aforesaid distance, it will fit between the projection 612a, and thereby the button 619 may be pressed downwardly.

Figure 21:
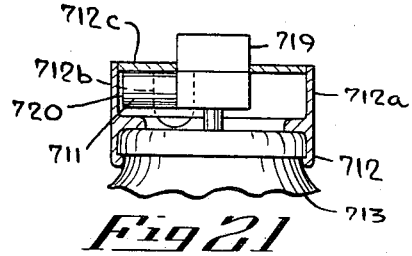
FIG. 21 is a fragmentary sectional view showing a still further modification.

In the embodiment of FIG. 21, the cap has been omitted altogether. The base 712 surrounds the spout structure 711, the latter being rotatable between two positions, namely an inactive position at which no discharge takes place, and which is shown in FIG. 21 and, respectively, a discharge position (not shown). In both positions, the button 719 may be pushed downwardly to initiate the discharge from the container 713. The wall 712a of the base 712 is so dimensioned, however, that in the inactive position it will seal the discharge orifice or spout 720 of the spout structure 711. The wall 712a of the base 712, on the other hand, is provided with a discharge opening 712b. When the spout structure 711 is rotated so that its orifice 720 is in register with the opening 712b, operation of the button 719 will lead to discharge of the contents of the container 713. The walls 712a of the base 712, including the sealing portion 720 and the opening 712b form part of control means that are supported by the base 712.

Like in FIG. 20, the spout structure 711 may be turned by manually turning the button 719. If desired, a cover 712c may be provided to conceal the contents from the viewer and to retain the spout structure atop the container 713.

I wish it to be understood that I do not desire to be limited to the exact details of construction shown and described, for obvious modifications will occur to a person skilled in the art.

Having thus described the invention, what I claim as new and desire to be secured by Letters Patent is as follows:

1. A captive actuator, for use in connection with a pressure operated container for flowing material having a discharge member which when moved in at least one of two opposite directions permits the ejection of said material from said container, the combination of a base adapted for encompassing the top of said container and for receiving a portion therethrough of said discharge member, a hollow spout structure being movable between an extreme discharge position, and another extreme inactive position wherein substantially no discharge of said material takes place, and comprising a conduit defined on its interior including a discharge orifice near one end and a spout hole in the lower surface of said spout structure, said conduit intercommunicating with said spout hole and discharge orifice, said spout hole being adapted to receive said discharge member and to receive therefrom flowing material, and said conduit guiding said material towards said discharge orifice, control means supported from said base including a part establishing an opening in registry with the discharge orifice when said spout structure is in the discharge position, and moving means including a rotatable cap supported with relation by said base and in driving connection with the spout and operable for moving said spout structure between said extreme positions linearly relative to said cap.

2. A captive actuator, as claimed in claim 1, at least a portion of said spout structure being movable in a path between a receiving station wherein said spout hole is adapted to receive said discharge member and, respectively, an inactive station wherein said spout hole is out of contact with said discharge member, said portion being adapted to move said discharge member in at least said one direction when in said receiving station, whereby said spout hole will receive flowing material of said container from said discharge member.

3. A captive actuator, as claimed in claim 2, said portion being in said receiving station when said spout structure is in the discharge position,
a wall at least partially surrounding said base and a large segment of said spout structure and including said part of said control means establishing said opening near the discharge position of said spout structure,
means operable for maintaining said spout structure away from said receiving station in the inactive extreme spout structure position,
and said control means including another part operable to seal the discharge orifice of said spout structure in the inactive extreme position.

4. In a captive actuator, as claimed in claim 1,
said cap surrounding said base and concealing at least a portion of said spout structure from view, said cap being rotatable and operable to be rotated manually,
and said moving means including said cap and cam means between said cap and said spout structure establishing a driving connection between said cap and spout structure.

5. A captive actuator, as claimed in claim 2,
said hollow spout structure having a length smaller than the major width of said base and being rotatable and linearly movable relative to said base between said extreme discharge and inactive positions,
said moving means comprising means operable for rotating said spout structure,
cam means disposed at said base providing a guide path,
and cam follower means for said cam means in driving connection with said spout structure and operable for moving said spout structure linearly when said spout structure is rotated.

6. In a captive actuator, as claimed in claim 5, said cam means defining a groove having several surfaces and including at least an arcuate portion, said cam follower means including an operating pin engaging at least one of said surfaces.

7. In a captive actuator, as claimed in claim 5, said arcuate cam means including a raised ridge comprising at least an arcuate portion and having two side surfaces, said cam follower means including an operating pin operable to make contact at least with a side surface of said cam.

8. In a captive actuator, as claimed in claim 5, said cap surmounting said base and spout structure and having a top so formed as to permit pressing said spout structure portion into the active station, said top of said cap including an integral flap hinged to the remainder of said cap and being movable relative thereto and operable to make contact with said spout structure portion when pressure is exerted onto said flap to move said spout structure portion into said receiving station.

9. In a captive actuator, as claimed in claim 5, said control means comprising another part operable for sealing said discharge orifice when said spout structure is positioned in the inactive position, said cam being so shaped that in the inactive position of the spout structure it will be pressed from said cam means through said cam follower means into a sealing pressure engagement with said other part.

10. In a captive actuator, as claimed in claim 6, said groove including a well parallel to said opposite directions of said discharge member movement, said operating pin being disposed in said well when said spout structure is in said discharge position and said spout structure portion is in said receiving station, said discharge member forming an operating part of a pump, whereby movement in at least one of said two opposite directions by said portion of said spout structure will through said discharge member operate said pump and flowing matrial will be discharged into said spout structure and out of its discharge orifice.

11. In a captive actuator, as claimed in claim 2, said container being permanently pressurized on its interior, said discharge member constituting a valve stem of said container, and means operable for retaining said portion releasably at the point to which it has moved said discharge member in said one direction, for sustained spray of said flowing material.

12. In a captive actuator, as claimed in claim 3, and removable means operable for restraining discharge of said flowing material prior to the removal of said removable means, thereby to indicate to an observer that the captive actuator has not yet been used.

13. In a captive actuator, as claimed in claim 12, said removable means comprising a lid formed in said aperture and prior to removal serving to seal said discharge orifice when it is moved towards the discharge position, releasing said discharge orifice after the lid has been forcibly removed.

14. In a captive actuator, as claimed in claim 12, said removable means including a blocking tab blocking the path of said spout structure portion prior to its forced removal.

15. In a captive actuator, as claimed in claim 1, said cap surrounding said base and including a skirt, said cap and skirt substantially completely concealing from external view said base and discharge member and spout structure.

16. In a dispensing cap, for use in connection with a valve operated container for pressurized flowing material wherein said valve has a stem which when depressed unseats said valve to permit the ejection of said material, the combination of
a base adapted for encompassing the top of said container and for receiving a portion of said stem therethrough,
arcuate moving cam means disposed at said base providing a predetermined rotational guide path,
lifting cam means disposed adjacent said moving cam means,
means establishing a clearance adjacent said lifting cam means,
a hollow spout structure having a length smaller than the major width of said base and being rotatable and linearly movable relative to said base between extreme positions of projection and, respectively, retraction and comprising
a spout formed near one end, and
cam follower means extending from the lower surface of said spout structure and engaging said moving cam means and being guided therealong when said spout structure is rotated and being operable to be positioned in alignment with said clearance near the projection position of said spout structure, said spout structure being adapted to be disposed over said stem,
a spout hole defined in the lower surface of said spout structure communicating with the interior thereof, said spout hole having a configuration adapted to receive said stem therein when in registry therewith, said spout hole being out of registry from said stem when said spout structure is near the retracted position,
and a cover having a side wall surrounding said base and spout structure and being rotatable relative to said base in opposite directions between open and closed cap positions, said cover including
guide means operable for guiding said spout structure to rotate together with the rotational movement of said cover,
an opening formed in the side wall of said cover in registry with the end of said spout near the projection position thereof and dimensioned to permit said spout to extend therethrough, and
the top of said cover being so formed as to permit pressing said spout structure towards said stem when said spout structure is near said projection position,
whereby, upon the rotation of said cover in one direction and the consequent guided movement of said cam follower means along said moving cam means, said spout structure is eccentrically rotated, the location of said spout hole being chosen such that it is adapted to come into registry with said valve stem in the open cap position wherein said spout structure is near said projected position and said cam follower is positioned in alignment with said clearance and said spout protrudes through said opening, the pressing of said spout structure from said top in the open cap position in a direction against said stem pushing said spout hole into engagement with said stem and depressing said stem thereby permitting said pressurized material to be injected into said spout hole and to be discharged from said spout; and, respectively, the rotation of said cover and the consequent rotation of said spout structure in the opposite direction effecting engagement of said cam follower means with said lifting cam means thereby lifting said spout structure off said stem, and said moving cam means retracting said spout from said opening thereby precluding accidental discharge from said container and removing said spout hole from registry with said stem and moving said spout structure to the retracted position and returning said cap to the closed position, said spout structure being fully contained within said base and cover in said retracted position.

17. In a dispensing cap, as claimed in claim 16, and further including a plurality of arcuate tabs extending upwardly from the circular periphery of said base, said tabs being angularly spaced from each other, at least one of said tabs having a height and an angular length such that said spout can freely pass thereover during the rotation of said cover to permit said spout to extend through said opening.

18. In a dispensing cap, as claimed in claim 17, wherein vertical posts are provided on said tabs engaging the edge of said spout when said spout structure is in either extreme position.

19. In a dispersing cap, as claimed in claim 18, wherein said spout is of parallelepiped configuration and said portion of said other tab between said post and the edge of said other tab opposite said spout is configured to seal off the end of the spout.

20. In a dispensing cap, as claimed in claim 16, wherein said spout comprises a spray head to enable it to function as a spray nozzle.

21. In a dispensing cap, as claimed in claim 16, wherein said base includes a member located to cover said spout hole when said cap is in the closed position.

22. In a dispensing cap, as claimed in claim 16, said spout structure including a button on the other end portion accessible through said window adapted for pressing on said valve stem portion.

23. In a dispensing cap, as claimed in claim 16, said moving cam means comprising a ridge, said cam follower means including two pins straddling said ridge, said clearance including two holes adjacent said ridge each receiving a pin near the projection position of said spout structure.

24. In a dispensing cap, as claimed in claim 16, wherein said cover has an inner height which is slightly greater than the sum of the height of the cylindrical wall of said base and said tabs, the lower edge of said cover being undercut around the lower edge of said base when said cover is in place.

References Cited

UNITED STATES PATENTS

| | | | |
|---|---|---|---|
| 2,598,308 | 5/1952 | Samuels et al. | 222—402.14 X |
| 2,706,660 | 4/1955 | Johnson et al. | 222—402.13 X |
| 2,752,066 | 6/1956 | Ayers | 222—402.12 X |
| 3,062,411 | 11/1962 | Miles | 222—402.11 X |
| 3,185,350 | 5/1965 | Abplanalp et al. | 222—402.13 X |

ROBERT B. REEVES, *Primary Examiner.*

F. R. HANDREN, *Assistant Examiner.*

U.S. Cl. X.R.

222—320, 402.11 402.12, 402.14